US009399305B2

(12) United States Patent
Yun et al.

(10) Patent No.: US 9,399,305 B2
(45) Date of Patent: Jul. 26, 2016

(54) SHEET CUTTING APPARATUS AND SHEET CUTTING METHOD USING THE SAME

(71) Applicant: Samsung Display Co., Ltd., Yongin, Gyeonggi-do (KR)

(72) Inventors: Sung-Sik Yun, Yongin (KR); Choong-Ho Lee, Yongin (KR); Tong-Jin Park, Yongin (KR); Doh-Hyoung Lee, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 186 days.

(21) Appl. No.: 14/011,490

(22) Filed: Aug. 27, 2013

(65) Prior Publication Data

US 2014/0130647 A1 May 15, 2014

(30) Foreign Application Priority Data

Nov. 13, 2012 (KR) ........................ 10-2012-0128374

(51) Int. Cl.

| | |
|---|---|
| ***B26D 7/14*** | (2006.01) |
| ***B26D 5/00*** | (2006.01) |
| ***B23Q 15/00*** | (2006.01) |
| ***B29C 65/00*** | (2006.01) |
| ***B29C 69/00*** | (2006.01) |
| ***B65H 81/00*** | (2006.01) |
| ***B26D 7/01*** | (2006.01) |
| ***B26D 1/00*** | (2006.01) |

(52) U.S. Cl.

CPC .. *B26D 7/14* (2013.01); *B26D 1/00* (2013.01); *B26D 7/015* (2013.01); *Y10T 83/0424* (2015.04); *Y10T 83/323* (2015.04)

(58) Field of Classification Search

CPC ............ B26D 7/14; B26D 1/00; B26D 7/015; Y10T 83/0424; Y10T 83/323; B29C 65/00; B29C 65/72; B29C 65/78; B29C 65/7802; B29C 65/7858; B29C 65/7888; B29C 65/7891

USPC .............. 83/72, 175; 156/193, 344, 354, 247, 156/584, 582, 494–495, 555, 510

See application file for complete search history.

(56) References Cited

U.S. PATENT DOCUMENTS

| | | | | |
|---|---|---|---|---|
| 2,590,185 A * | 3/1952 | Land | G03D 9/02 | 118/DIG. 15 |
| 3,481,830 A * | 12/1969 | Hanke | B31F 1/07 | 156/462 |
| 4,660,399 A | 4/1987 | Suter et al. | | |

(Continued)

FOREIGN PATENT DOCUMENTS

| | | |
|---|---|---|
| EP | 0 507 733 A1 | 10/1992 |
| JP | 10-109795 A | 4/1998 |
| KR | 1992-0019654 A | 11/1992 |

*Primary Examiner* — Ghassem Alie
*Assistant Examiner* — Bharat C Patel
(74) *Attorney, Agent, or Firm* — Knobbe, Martens, Olson & Bear, LLP

(57) ABSTRACT

A sheet cutting apparatus and a sheet cutting method using the same are disclosed. In one aspect, the sheet cutting apparatus includes a holder for rotatably supporting a sheet roll, a lamination unit for pulling and unwinding a front end of the sheet unwound from the sheet roll, a table on which the sheet unwound by the lamination parts is attached, and a tension unit for giving tension to the sheet attached on the table. Since the sheet cutting apparatus may cut the sheet consistently and stably, product quality and production efficiency should increase.

5 Claims, 2 Drawing Sheets

(56) References Cited

U.S. PATENT DOCUMENTS

| | | | | | |
|---|---|---|---|---|---|
| 4,865,677 | A | * | 9/1989 | Matsushita et al. | 156/353 |
| 4,925,515 | A | * | 5/1990 | Yoshimura et al. | 156/250 |
| 5,106,450 | A | * | 4/1992 | Freisitzer | B32B 38/04 156/517 |
| 5,310,442 | A | * | 5/1994 | Ametani | 156/353 |
| 5,397,415 | A | * | 3/1995 | Manabe | B26D 3/08 156/234 |
| 5,824,178 | A | * | 10/1998 | Shingu et al. | 156/265 |
| 6,200,402 | B1 | * | 3/2001 | Amo | 156/235 |
| 6,514,372 | B1 | * | 2/2003 | Yamazaki | 156/256 |
| 7,090,743 | B2 | * | 8/2006 | Colson et al. | 156/583.5 |
| 7,438,776 | B2 | * | 10/2008 | Kobayashi et al. | 156/64 |
| 7,611,600 | B2 | * | 11/2009 | Tsujimoto et al. | 156/249 |
| 7,686,916 | B2 | * | 3/2010 | Tsujimoto et al. | 156/714 |
| 7,757,741 | B2 | * | 7/2010 | Ametani | H01L 21/67132 156/153 |
| 7,846,289 | B2 | * | 12/2010 | Tsujimoto et al. | 156/247 |
| 7,896,050 | B2 | * | 3/2011 | Yamamoto et al. | 156/522 |
| 8,042,441 | B2 | * | 10/2011 | Kaneshima et al. | 83/72 |
| 8,196,632 | B2 | * | 6/2012 | Tsujimoto et al. | 156/517 |
| 2003/0062116 | A1 | * | 4/2003 | Lee | 156/249 |
| 2008/0011412 | A1 | * | 1/2008 | Tsujimoto et al. | 156/193 |
| 2010/0294416 | A1 | * | 11/2010 | Yamamoto et al. | 156/64 |
| 2011/0232820 | A1 | * | 9/2011 | Yamamoto et al. | 156/60 |

* cited by examiner

SHEET CUTTING APPARATUS AND SHEET CUTTING METHOD USING THE SAME

CROSS-REFERENCE TO RELATED PATENT APPLICATION

This application claims the benefit of Korean Patent Application No. 10-2012-0128374, filed on Nov. 13, 2012, in the Korean Intellectual Property Office, the disclosure of which is incorporated herein in its entirety by reference.

BACKGROUND

1. Field

The described technology generally relates to a sheet cutting apparatus to cut rolls of metal sheets into standard sheets.

2. Description of the Related Technology

Generally, metal masks are used for color patterning of organic light-emitting devices (OLEDs), and producing metal masks may require cutting rolled metal sheets into standard sheets.

SUMMARY

One inventive aspect is an improved sheet cutting apparatus and a sheet cutting method using the same to cut rolled metal sheets into standard sheets.

Another aspect is a sheet cutting apparatus, which includes: a holder for rotatably supporting a sheet roll; a lamination unit for pulling and unwinding a front end of a sheet from the sheet roll; a table on which the sheet unwound by the lamination unit is attached; and a tension unit for applying tension to the sheet attached on the table.

The tension unit is installed between the holder and the table and may include a tension roller for providing backward tension on the sheet spread on the table.

The lamination unit may include a pair of lamination rollers for grasping a front end of the sheet roll and a guide unit for guiding the pair of lamination rollers to travel on the table.

The guide unit may guide the lamination rollers along a circular path so that the lamination rollers may go forward and then descend without contacting the table and may come backward while contacting the table.

A cutter for cutting a rear end of the sheet attached on the table may be additionally included.

Another aspect is a sheet cutting method which includes: pulling and unwinding a front end of a sheet from a sheet roll; attaching the unwound sheet on a table; applying tension to the sheet while the sheet is attached on the table; and cutting a rear end of the sheet attached on the table.

The pulling and unwinding the sheet from the sheet roll and attaching the unwound sheet on the table may be performed by movement of the pair of lamination rollers having grasped the front end of the sheet.

The pair of lamination rollers may go forward and then descend without contacting the table, to thus make the front end of the sheet contact on the table, and may come backward without contacting the table, to then press the sheet on the table.

The sheet cutting apparatus and the sheet cutting method using the same according to the present invention may cut rolled sheets consistently and stably. Therefore, stabilization of product quality and an increase of producing efficiency may be expected in case of adopting the present invention.

DETAILED DESCRIPTION

Generally, if rolled metal sheets are not pulled and spread tensely in a cutting process, it might be hard to cut sheets into standard sheets. It induces productivity to be sharply decreased because of an increased defective rate of sheets.

Embodiments will now be described more fully with reference to the accompanying drawings. A sheet cutting apparatus according to an embodiment will be described with reference to FIG. 1.

Figure 1:
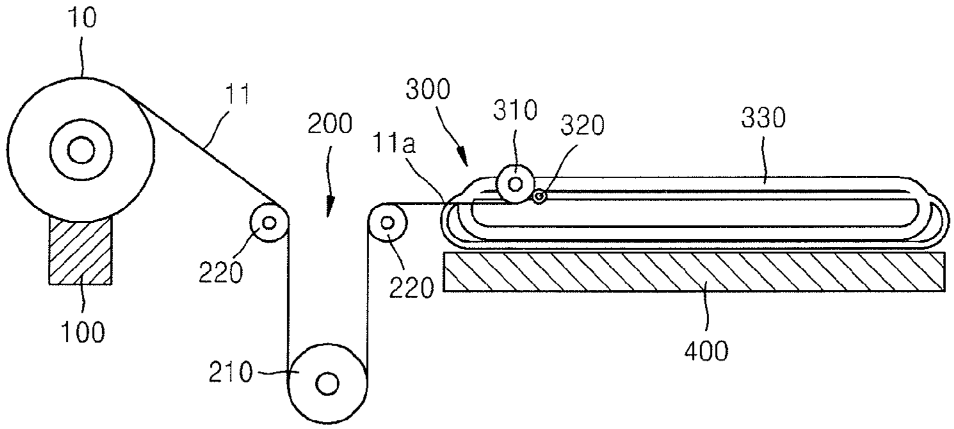
FIG. 1 is a schematic view showing a structure of a sheet cutting apparatus according to an embodiment.

As shown in FIG. 1, the sheet cutting apparatus according to the present embodiment includes a holder 100, a lamination unit 300, a table 400, and a tension unit (or a tensioner) 200. The holder 100 rotatably supports a sheet roll 10 around which a sheet is wound in a roll form. The lamination unit 300 clamps and unwinds a front end 11*a* of the sheet 11 from the sheet roll 10. The sheet 11 unwound by the lamination unit 300 is attached on the table 400. The tension unit 200 gives tension to the sheet 11 attached on the table 400.

The tension unit 200 gives tight tension to the sheet 11 to thus substantially prevent the sheet 11 from wrinkling in a non-uniformed form when the lamination unit 300 unwinds the sheet 11 from the sheet roll 10 which is mounted on the holder 100 to then be attached on the table 400. In this state, a cutter 500 shown in FIG. 2D cuts a rear end 11*b* of the sheet 11 shown in FIG. 2D. The tension unit 200 gives backward tension to the sheet 11 attached on the table 400. The tension unit 200 includes a tension roller 210 that gives tension to the sheet 11 by pressing the sheet 11 downward as shown in FIG. 1. Therefore, the tension applied on the sheet 11 may be controlled gradually by location of the tension roller 210.

The lamination unit 300 includes a pair of lamination rollers 310 and 320 that grasp a front end 11*a* of the sheet 11, and a guide unit 330 for guiding the rollers 310 and 320 to travel on the table 400. In one embodiment, the pair of lamination rollers 310 and 320 move along the guide unit 330 at a state where they clamp the front end 11*a* of the sheet 11, to thus unwind the sheet 11 form the sheet roll 10 and substantially simultaneously press the unwound sheet 11 to then be attached on the table 400. This process is performed when the lamination rollers 310 and 320 circulate along the guide unit 330 and will be described again later.

Reference numeral 220 denotes guide rollers of the tension unit 200 and the sheet 11 may be a metallic material such as Invar.

Figure 2A:
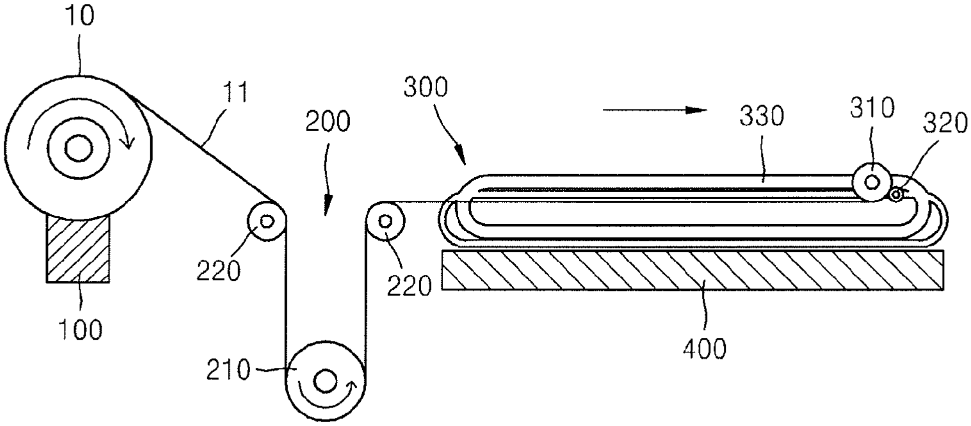
FIGS. 2A through 2D are schematic views illustrating a cutting process by the sheet cutting apparatus shown in FIG. 1 in consecutive order.
Figure 2B:
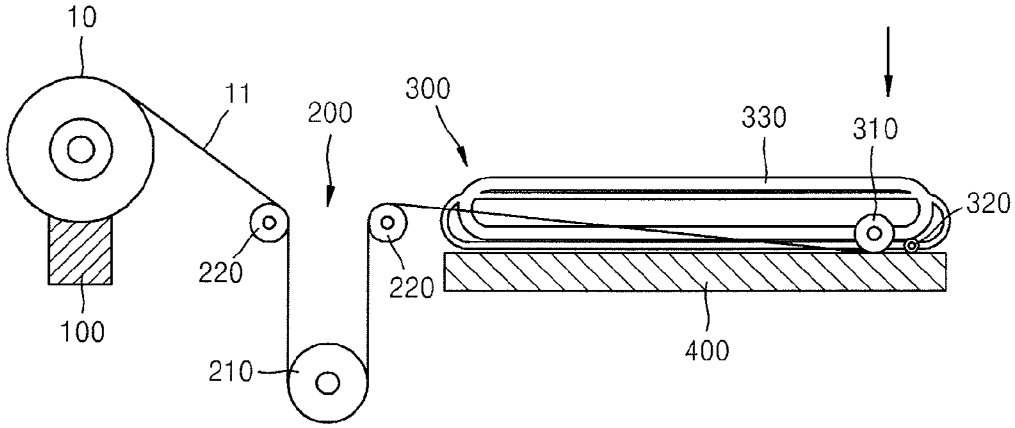

The sheet cutting apparatus as constructed above may be used as follows. First, the sheet roll 10 is mounted on the holder 100. Then, the front end 11*a* of the sheet 11 unwound from the sheet roll 10 is clamped on the lamination rollers 310 and 320 through the tension roller 210 as shown in FIG. 1. After the above preparation has been completed, the lamination rollers 310 and 320 are made to move along the guide unit 330 as shown in FIG. 2A. Then, the sheet roll 10 revolves along with movement of the lamination rollers 310 and 320, to thus unwind the sheet 11 from the sheet roll 10. In this process, the lamination rollers 310 and 320 pass above the table 400 without contacting the table 400. While the lamination rollers 310 and 320 may be made to substantially constantly move along the guide unit 330, they may descend and press the clamped front end 11*a* of the sheet 11 on the table 400 to then be attached on the table 400 as shown in FIG.

2B. Then, the two lamination rollers 310 and 320 are separated from each other to thus unclamp the front end 11*a* of the sheet 11.

Figure 2C:
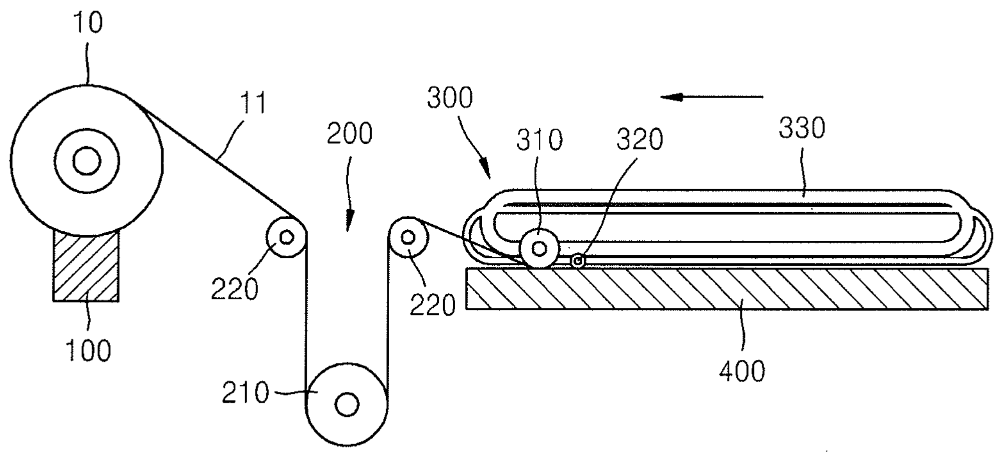

When the lamination rollers 310 and 320 move back to the initial position in this state above as described in the FIG. 2C, the lamination rollers 310 and 320 press the sheet 11 unwound from the sheet roll 10 sequentially, to then be attached on the table 400. The sheet 11 is prevented from wrinkling in a non-uniform shape since the tension roller 210 gives tight tension to the sheet 11 during the process.

Figure 2D:
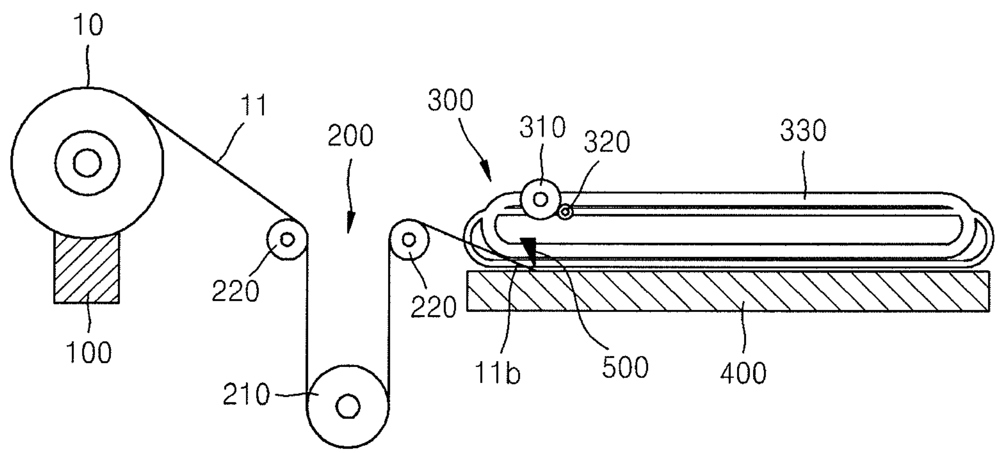

The standard sheets may be produced after the rear end 11*b* of the sheet 11 attached on the table 400 is cut by the cutter 500, as shown in FIG. 2D. Since the sheet 11 may be cut at a tight tensioned state, it may be possible to produce the exact standard sheets stably.

According to at least one of the disclosed embodiments, the sheet cutting apparatus described above may cut the sheet consistently and stably, and thus stabilization of product quality and producing efficiency may increase.

While the above embodiments have been described with reference to the accompanying drawings, it will be understood by those of ordinary skill in the art that various changes in form and details may be made therein without departing from the spirit and scope of the present invention as defined by the following claims.

What is claimed is:

1. A sheet cutting apparatus comprising:

a holder configured to rotatably support a sheet roll;

a lamination unit configured to pull and unwind a front end of a sheet from the sheet roll;

a table on which the sheet unwound by the lamination unit is attached; and a tensioner configured to provide tension to the sheet attached on the table, wherein the lamination unit comprises a pair of lamination rollers configured to clamp the front end of the sheet to unwind the sheet from the sheet roll and press the unwound sheet to be attached on the table, wherein the lamination rollers have different sizes and are configured to move along respective specific closed loops over the table, wherein the specific closed loops are adjacent to each other, and wherein the lamination unit further comprises a guide unit configured to guide the lamination rollers along the specific closed loops so that the lamination rollers go forward and then descend without contacting the table and come backward while contacting the table.

2. The apparatus of claim 1, wherein the tension unit is installed between the holder and the table and wherein the tension unit further comprises a tension roller configured to provide backward tension to the sheet attached on the table.

3. The apparatus of claim 1, further comprising a cutter configured to cut a rear end of the sheet attached on the table.

4. The apparatus of claim 1, wherein each of the specific closed loops is placed directly above the table.

5. The apparatus of claim 1, wherein each of the specific closed loops has an elongated shape.

* * * * *